United States Patent Office 3,518,298
Patented June 30, 1970

3,518,298
DIALKANOYLOXYBUTENE PRODUCTION
Walter H. Peterson, Point Richmond, Calif., assignor to Shell Oil Company, New York, N.Y., a corporation of Delaware
No Drawing. Filed Jan. 16, 1968, Ser. No. 698,124
Int. Cl. C07c 67/04
U.S. Cl. 260—497                                   3 Claims

ABSTRACT OF THE DISCLOSURE 1,2-dialkanoyloxy-3-butene and 1,4-dialkanoyloxy-2-butene are produced as the major products by the process which comprises intimately contacting butadiene, butadiene polyperoxide, and an alkanoic acid or alkanoic acid anhydride in the presence of a palladium salt as catalyst.

DESCRIPTION OF THE PRIOR ART

Methods for the conversion of butadiene polyperoxide to butenediols and corresponding esters such as 1,4-diacetoxy-2-butene are known in the art. For example, Handy et al., J. Am. Chem. Soc. 80, 5306 (1958), disclose that butadiene polyperoxide is reduced with lithium aluminum hydride to 2-butene-1,4-diol. However, the process of Handy et al. is noncatalytic and accordingly requires a stoichiometric amount of lithium aluminum hydride.

Methods for producing monoalkanoyloxybutene products from $C_4$-olefins by reaction with palladium acetate are also known in the art, but such processes are also noncatalytic. For example, the conversion of butene-2 to 1-acetoxybutene-2 in the presence of palladium acetate results in the concomitant conversion of the palladium acetate to unreactive palladium metal, as disclosed by Kitching et al., J. Am. Chem. Soc., 88, 2054 (1967).

SUMMARY OF THE INVENTION

It has now been found that 1,2-dialkanoyloxy-3-butene and 1,4-dialkanoyloxy-2-butene are produced as the major products by a catalytic process which comprises contacting butadiene and butadiene polyperoxide in the presence of an alkanoic acid or alkanoic acid anhydride and a palladium salt as catalyst. By reaction in accordance with the process of the invention, both butadiene and butadiene polyperoxide are converted to an ester mixture which is composed principally of 1,2-dialkanoyloxy-3-butene and 1,4-dialkanoyloxy-2-butene. By way of illustration, the reaction of substantially equimolar amounts of butadiene and butadiene polyperoxide in acetic acid or acetic anhydride solvent in the presence of palladium acetate as catalyst produces 1,2-diacetoxy-3-butene and 1,4-diacetoxy-2-butene.

DESCRIPTION OF PREFERRED EMBODIMENTS

Butadiene and butadiene polyperoxide

Any commercially available grade of butadiene of reasonable purity is suitable for use in the process of the invention. Although any polymeric butadiene polyperoxides containing units of the Formula I $$[-C_4H_6-OO-C_4H_6-OO-]  \qquad (I)$$

wherein the $C_4H_6$ radicals are bonded to oxygen in the 1 and 2 positions or in the 1 and 4 positions are operable in the process of the invention, it is generally advantageous to employ normally liquid polymeric butadiene polyperoxide having an average composition corresponding to the formula $(C_4H_6O_2)_x$ wheerin $x$ is 4 to 10, inclusive, prepared as disclosed by U.S. Pat. 2,898,377 of Hardy et al., issued Aug. 4, 1959.

The butadiene and butadiene polyperoxide are used in substantially stoichiometric amounts, i.e., about one mole of —OO— peroxy linkage of the butadiene polyperoxide is employed for each mole of butadiene. Generally, ratios of moles of butadiene to moles of peroxy linkage of from about 1:1 to about 5:1 are satisfactory, although molar ratios of about 1:1 to about 3:1 are preferred.

The alkanoic acid or alkanoic acid anhydride

The process of the invention employs a monocarboxylic alkanoic acid or a monocarboxylic acid anhydride in proportions at least equimolar to the butadiene reactant. Suitable alkanoic acids are those of up to 10 carbon atoms, although alkanoic acids from 2 to 6 carbon atoms such as acetic acid, propionic acid, butyric acid, isobutyric acid and hexanoic acid are preferred. Suitable alkanoic acid anhydrides comprise the lower alkanoic acid anhydrides, e.g., anhydrides of lower alkanoic acids of from 2 to 6 carbon atoms such as acetic anhydride, propionic anhydride, butanoic anhydride and the like. Moreover, the alkanoic acid or anhydride is employed as a single species or in admixture with like acidic materials.

Since the alkanoic acids and alkanoic acid anhydrides are excellent diluents or cosolvents for the reaction, it is preferred that they be used in molar excess to provide the liquid medium used for the process. Generally, molar ratios of alkanoic acid, alkanoic acid anhydride or mixtures thereof to butadiene of about 20:1 to about 2:1 are satisfactory with molar ratios of about 10:1 to about 5:1 being preferred.

The palladium catalyst

The palladium compound employed in the process must be substantially present in the reaction medium as a palladium(II) alkanoate of up to 10 carbon atoms, preferably of from 2 to 6 carbon atoms, such as palladium acetate, palladium propionate, palladium butyrate, palladium hexanoate and the like. As a matter of convenience, it is usually preferable to introduce the palladium catalyst as a palladium alkanoate, the anion of which corresponds to the alkanoate moiety of the particular alkanoic acid or alkanoic acid anhydride reactant which is employed, e.g., as palladium propionate when propionic acid or propionic anhydride is employed. However, it is often advantageous to employ compounds of palladium with other anions, one or more of which can be displaced by an alkanoate moiety of the alkanoic acid or alkanoic anhydride to give the desired palladium alkanoate catalyst species in situ, e.g., compounds such as palladous acetylacetonate, palladium(II) dibenzonitrile dichloride, palladous dichloride, palladium(II)-olefin complexes, palladium(II)-$\pi$-allyl complexes and the like.

The palladium compound is employed in molar ratios of palladium compound to butadiene of from about 1:100 to about 1:2. Generally, the preferred molar ratio of palladium compound to butadiene is from about 1:4 to about 1:20.

The reaction conditions

The method of reactant contacting may be varied. In one modification the entire amount of reactants are charged to an autoclave or similar reactor and the mixture is maintained at reaction temperature and pressure until reaction is complete. It is also useful to conduct the reaction in a continuous manner as by contacting reactants and catalyst during passage through a tubular reactor. In yet another modification, one reaction mixture component is added to the others in increments, as by gradually adding the butadiene polyperoxide to a mixture of the butadiene, palladium catalyst and alkanoic acid or alkanoic acid anhydride. In any modification, the reaction is carried out at elevated temperatures. Suitable temperatures vary from about 25° C. to about 150° C. although temperatures of from about 50° C. to about 100° C. are preferred. Reaction pressures which are atmospheric or superatmospheric are suitably employed provided the reaction mixture is maintained substantially in the liquid phase. Generally, pressures of from about 10 p.s.i.g. to about 500 p.s.i.g. are satisfactory.

The solubility of the palladium catalyst appears to be increased by the presence of an alkali metal alkanoate salt in the reaction medium. Accordingly, in certain modifications it has been found that alkali metal alkanoates are advantageously employed in conjunction with the preferred palladium alkanoate salt. Although alkanoate salts of alkali metals of atomic number from 3 to 55, inclusive, i.e., lithium, sodium, potassium, rubidium, and cesium, are operable, alkali metals of atomic number from 3 to 19, i.e., lithium, sodium, and potassium, are preferred. The alkanoate anion preferably corresponds to the alkanoate anion of the palladium catalyst, and accordingly is a lower alkanoate, e.g., acetate, propionate, butyrate, and the like. Suitable alkali metal alkanoates therefore include lithium acetate, sodium acetate, potassium acetate, potassium propionate, potassium butyrate. When present, the alkali metal alkanoate is employed in a molar ratio of alkali metal alkanoate to palladium catalyst of up to about 10:1.

The process of the invention is conducted in the presence or in the absence of an additional reaction diluent. In the modifications where a diluent is employed, diluents that are suitable are those which are liquid at reaction temperature and pressure and are inert toward the reactants and products thereof. Illustrative of suitable diluents are saturated hydrocarbons such as hexane and decane; aromatic hydrocarbons such as benzene, toluene, and xylene; ethers including dialkyl ethers such as diethyl ether, dipropyl ether and methyl octyl ether, cyclic ethers such as 1,4-dioxane, 1,3-dioxane, tetrahydropyran, and lower alkyl ethers of polyhydric alcohols and poly(oxyalkylene)-glycols including dimethoxyethane, diethylene glycol dimethyl ether and tetraethylene glycol dimethyl ether; nitriles such as acetonitrile, propionitrile and benzonitrile; sulfones such as diethyl sulfone and sulfolane; sulfoxides such as dimethylsulfoxide and amides such as N,N-dimethylacetamide and dimethylformamide. The diluent, if any, is employed in ratios of moles of diluent to moles of alkanoic acid, alkanoic acid anhydride or mixture thereof of up to about 5:1.

Subsequent to reaction, the reaction mixture is separated and the desired products are recovered by conventional means such as selective extraction, fractionation distillation and chromatographic techniques.

The dialkanoyloxybutene products 1,2-dialkanoyloxy-3-butene and 1,4-dialkanoyloxy-2-butene are the major products of the process of the invention. Although the relative proportions of these two products will in part depend upon the structure of the butadiene polyperoxide reactant, i.e., the relative proportion of 1,2- and 1,4-peroxy units, substantially equimolar amounts of the 1,2-dialkanoyloxy-3-butene and 1,4-dialkanoyloxy-2-butene products are generally obtained.

The products of the invention are of established utility in a variety of applications. The presence of diester functional groups render these products useful as plasticizers for vinyl polymers, e.g., as disclosed by Swiss 237,401 of Staeger, issued Jan. 16, 1946. The products can be hydrolyzed with base to produce the corresponding 3-butene-1,2-diol and 2-butene-1,4-diol compounds. 2-butene-1,4-diol is useful in preparing vinyl polymers by copolymerization with vinyl acetate as disclosed by U.S. 2,740,771 of Longley et al., issued Apr. 3, 1956. 2-butene-1,4-diol and 3-butene-1,2-diol are hydrogenated with conventional catalysts such as Raney nickel to butane-1,4-diol and butane-1,2-diol, respectively, which are chemicals of commerce. For example, butane-1,4-diol is reacted with maleic anhydride or phthalic anhydride to give useful polyester resins as disclosed by German Pat. 1,026,523 of Beck et al., issued Mar. 20, 1958, and butane-1,2-diol is converted to the cyclic carbonate, e.g., with phosgene, which is useful as a motor oil additive as disclosed by U.S. 2,939,774 of Oberdorfer, issued June 7, 1960.

To further illustrate the improved process of the invention, the following example is provided. It should be understood that the details thereof are not to be regarded as limitations as they may be varied as will be understood by one skilled in the art.

EXAMPLE

A mixture of 0.034 mole of butadiene, 0.032 mole of butadiene polyperoxide, 0.004 mole of palladium acetate and 0.016 mole of sodium acetate in 1 ml. of acetic anhydride, 10 ml. of acetic acid and 10 ml. of benzene was heated at 50° C. for 2 hours in a glass pressure reactor. Separation and gas-liquid chromatographic analysis of the reaction mixture showed a 95% conversion of butadiene and an essentially complete conversion of butadiene polyperoxide to product mixture which contained 25.6 mole percent of 1,2-diacetoxy-3-butene and 27.6 mole percent of 1,4-diacetoxy-2-butene.

I claim as my invention:

1. The process of producing 1,2-dialkanoyloxy-3-butene and 1,4-dialkanoyloxy-2-butene products by intimately contacting butadiene and butadiene polyperoxide wherein the molar ratio of butadiene to peroxy linkages of the butadiene polyperoxide is from about 1:1 to about 5:1, with an excess of a monocarboxylic alkanoic acid of up to 10 carbon atoms, the corresponding alkanoic acid anhydride, or a mixture thereof, in the presence of a palladium alkanoate as catalyst, at a temperature of from about 25° C. to about 150° C.

2. The process of claim 1 wherein the monocarboxylic acid has from 2 to 6 carbon atoms.

3. The process of claim 2 wherein the alkanoate moiety of each of the palladium alkanoate and the alkanoic acid or alkanoic acid anhydride is acetate.

References Cited

UNITED STATES PATENTS 3,221,045  11/1965  McKeon et al. _____ 260—497
3,394,170   7/1968  Kohll _____ 260—491

LORRAINE A. WEINBERGER, Primary Examiner

V. GARNER, Assistant Examiner

U.S. Cl. X.R.

260—410.6, 635, 31.6, 75